United States Patent
Johansson

(10) Patent No.: US 9,671,924 B2
(45) Date of Patent: Jun. 6, 2017

(54) INTEGRATED SCROLLBAR OPTIONS MENU AND RELATED METHODS, DEVICES, AND COMPUTER PROGRAM PRODUCTS

(75) Inventor: Fredrik Johansson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1213 days.

(21) Appl. No.: 13/133,542

(22) PCT Filed: Aug. 20, 2010

(86) PCT No.: PCT/IB2010/002071
§ 371 (c)(1),
(2), (4) Date: Jun. 8, 2011

(87) PCT Pub. No.: WO2012/022999
PCT Pub. Date: Feb. 23, 2012

(65) Prior Publication Data
US 2012/0167003 A1    Jun. 28, 2012

(51) Int. Cl.
*G06F 3/048* (2013.01)
*G06F 3/0481* (2013.01)
*G06F 3/0485* (2013.01)
*G06F 3/0488* (2013.01)

(52) U.S. Cl.
CPC ...... *G06F 3/04812* (2013.01); *G06F 3/04855* (2013.01); *G06F 3/04883* (2013.01)

(58) Field of Classification Search
CPC .................................................. G06F 3/048
USPC ........................................................ 715/786
See application file for complete search history.

(56) References Cited

U.S. PATENT DOCUMENTS

| | | | |
|---|---|---|---|
| 6,252,594 B1 * | 6/2001 | Xia et al. | 715/786 |
| 7,477,233 B2 * | 1/2009 | Duncan et al. | 345/156 |
| 2002/0186252 A1 | 12/2002 | Himmel et al. | |
| 2006/0075357 A1 * | 4/2006 | Guido et al. | 715/784 |
| 2008/0020810 A1 * | 1/2008 | Park | 455/575.1 |
| 2009/0094562 A1 * | 4/2009 | Jeong et al. | 715/863 |

(Continued)

FOREIGN PATENT DOCUMENTS

| | | |
|---|---|---|
| EP | 1 873 623 | 1/2008 |
| EP | 1 947 560 | 7/2008 |

OTHER PUBLICATIONS

International Search Report corresponding to PCT Application No. PCT/IB2010/002071, Date of Mailing: Apr. 6, 2011.

(Continued)

*Primary Examiner* — Xuyang Xia
(74) *Attorney, Agent, or Firm* — Myers Bigel, P.A.

(57) ABSTRACT

An electronic device includes an integrated scrollbar options menu, a display screen, and a graphical user interface for navigating the display screen. The graphical user interface includes a scrollbar that is operable to scroll display content in a first direction corresponding to an axis of the scrollbar in response to a first navigational movement of the scrollbar in the first direction corresponding to the axis. The scrollbar includes the integrated scrollbar options menu. The integrated scrollbar options menu is configured to be accessed by expanding the scrollbar using a second navigational movement of the scrollbar that is different from the first navigational movement.

2 Claims, 7 Drawing Sheets

(56) References Cited

U.S. PATENT DOCUMENTS

2009/0187860 A1* 7/2009 Fleck et al. .................. 715/834
2010/0008031 A1* 1/2010 Reifman et al. ........... 361/679.3
2010/0039400 A1* 2/2010 Jang ............................ 345/173
2010/0302172 A1* 12/2010 Wilairat ...................... 715/863

OTHER PUBLICATIONS

Written Opinion of the International Searching Authority corresponding to PCT/IB2010/002071, Date of Mailing: Apr. 6, 2011.
European Office Action Corresponding to European Patent Application No. 10 760 409.2; Date Mailed: Jul. 29, 2014; 5 Pages.

* cited by examiner

INTEGRATED SCROLLBAR OPTIONS MENU AND RELATED METHODS, DEVICES, AND COMPUTER PROGRAM PRODUCTS

RELATED APPLICATIONS

The present application is a 35 U.S.C. §371 national phase application of PCT International Application No. PCT/IB2010/002071, having an international filing date of Aug. 20, 2010, the disclosure of which is incorporated herein by reference in its entirety.

FIELD OF THE INVENTION

The present invention generally relates to the field of electronic devices and, more particularly, to graphical user interfaces corresponding with electronic devices.

BACKGROUND

Electronic devices, such as MP3 players, mobile telephones, navigational devices, and personal digital assistants (PDAs), may display various lists and pages of display content, such as web pages and lists of messages, music, and/or destinations, among others, via display screens. Navigation of the lists and pages is performed in some electronic devices using a graphical user interface that corresponds with movement of a scrollbar. Navigation of long lists and multiple pages may require a significant amount of scrolling.

In some electronic devices, users can quickly navigate through lists and pages by scrolling quickly. Scrolling quickly, however, may result in scrolling past desired portions of the lists and pages.

SUMMARY

Some embodiments of the present invention include methods of operating an integrated scrollbar options menu in a graphical user interface of an electronic device. Operations according to some embodiments of such methods may include highlighting a scrollbar that is operable to scroll display content in a first direction corresponding to an axis of the scrollbar in response to a first navigational movement of the scrollbar in the first direction corresponding to the axis and that includes the integrated scrollbar options menu. The operations may further include accessing the integrated scrollbar options menu by expanding the scrollbar using a second navigational movement of the scrollbar that is different from the first navigational movement.

In some embodiments, highlighting the scrollbar includes selecting the scrollbar such that a movement in the first direction moves the scrollbar.

Some embodiments further include collapsing the integrated scrollbar options menu into the scrollbar using a third navigational movement of the scrollbar.

In some embodiments, the second navigational movement includes dragging the scrollbar, from a collapsed position that hides the scrollbar options menu toward an expanded position that displays the scrollbar options menu, in a second direction that is substantially perpendicular to the axis of the scrollbar. The third navigational movement may include dragging the scrollbar from the expanded position toward the collapsed position.

In some embodiments, the second navigational movement includes tapping the scrollbar and the third navigational movement includes tapping the scrollbar.

In some embodiments, highlighting the scrollbar includes accessing a navigational feature of a highlight-driven interface. The second navigational movement may include operating the navigational feature to navigate in a second direction that is substantially perpendicular to the axis of the scrollbar. The third navigational movement may include operating the navigational feature to navigate in a third direction that is substantially perpendicular to the axis of the scrollbar.

In some embodiments, accessing the integrated scrollbar options menu by expanding the scrollbar includes navigating a touch interface that includes a touch sensor configured to detect a location of a plurality of contact points on a display screen associated with the electronic device.

In some embodiments, the integrated scrollbar options menu includes at least one of: a snap-to-section option, in which scrolling of the display content in response to the first navigational movement from a first section of the display content stops at a second section of the display content that is adjacent the first section; a screen-by-screen option, in which scrolling of the display content in response to the first navigational movement from a first screen of the display content stops at a second screen of the display content that is adjacent the first screen; a continuous scrolling option, in which the first navigational movement from the first section provides continuous scrolling through the second section; and a scrolling speed option, in which the first navigational movement provides scrolling through the display content at a predetermined rate.

An electronic device according to some embodiments includes an integrated scrollbar options menu. The electronic device may further include a display screen and a graphical user interface for navigating the display screen. The graphical user interface may include a scrollbar that is operable to scroll display content in a first direction corresponding to an axis of the scrollbar in response to a first navigational movement of the scrollbar in the first direction corresponding to the axis and that includes the integrated scrollbar options menu. The integrated scrollbar options menu may be configured to be accessed by expanding the scrollbar using a second navigational movement of the scrollbar that is different from the first navigational movement.

Some embodiments provide that the electronic device is a mobile handheld device.

In some embodiments, the integrated scrollbar options menu is configured to be collapsed into the scrollbar using a third navigational movement of the scrollbar.

In some embodiments, the graphical user interface includes a touch interface. The touch interface may include a touch sensor that is configured to detect a location of a plurality of contact points on the display screen.

A computer program product according to some embodiments may provide operations of an integrated scrollbar options menu in a graphical user interface of an electronic device. The computer program product may include a non-transitory computer readable storage medium including computer readable program code therein that is configured to access the integrated scrollbar options menu in response to expansion of a scrollbar. The expansion of the scrollbar may include a second navigational movement of the scrollbar that is different from a first navigational movement of the scrollbar that is in a first direction corresponding to an axis of the scrollbar.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

DETAILED DESCRIPTION OF EMBODIMENTS

Figure 1:
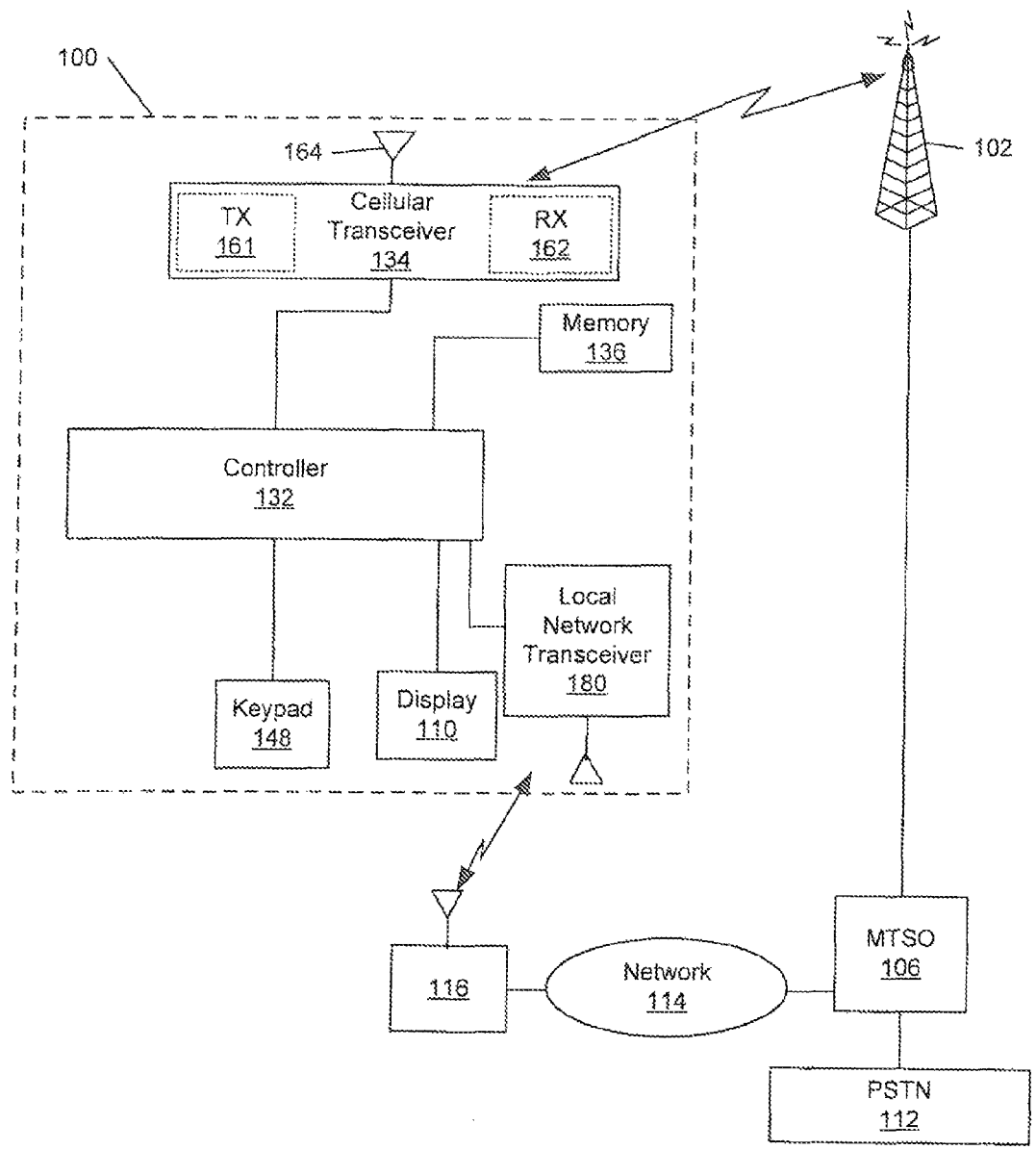
FIG. 1 is a schematic block diagram of a communications system that includes an electronic device using an integrated scrollbar options menu according to some embodiments of the present invention.

The present invention now will be described more fully with reference to the accompanying drawings, in which embodiments of the invention are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are also described using block diagrams. It will be understood that a block of the block diagrams, and combinations of blocks of the block diagrams, may be implemented at least in part by computer program instructions. These program instructions may be provided to a processor circuit, such as a microprocessor, microcontroller, or other processor, such that the instructions which execute on the processor(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks. A computer program according to embodiments of the invention comprises a tangible, non-transitory computer usable storage medium having computer-readable program code embodied therein. Accordingly, a given block or blocks of the block diagrams provides support for methods, computer program products, and/or devices.

Computer program code or "code" for carrying out operations in embodiments may be written in a procedural language provided by a database environment, such as PL/SQL in an Oracle database or Transact-SQL in Microsoft or Sybase databases, and/or a programming language such as Java, C++, JavaScript, Visual Basic, Perl, or in various other programming languages. Software embodiments do not depend on implementation with a particular programming language. The code, or portions thereof, may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the web (e.g., via an Internet Service Provider). It is understood that the present embodiments are not TCP/IP-specific or internet-specific. Exemplary embodiments may be implemented using various protocols over various types of computer networks.

The computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process, such that the instructions which execute on the processor provide steps for implementing the functions/acts specified in the block or blocks.

Accordingly, the blocks support combinations of means for performing the specified functions, combinations of steps for performing the specified functions, and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the block diagrams may occur out of the order noted in the block diagrams. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Embodiments of the present invention arise from the realization that electronic devices may not include sufficient user interfaces for efficiently scrolling through content displayed on the electronic devices. By way of example, "flicking" through display content, or otherwise setting scrolling in motion, using an electronic device with a touch screen interface may result in scrolling past a desired portion of the display content. Additionally, customization of user interfaces, including customization of scrolling options, may be inefficient if such customization requires users to navigate through several layers of user interfaces. Embodiments described herein, however, include a scrollbar options menu that is integrated into a scrollbar in a graphical user interface of an electronic device.

Reference is now made to FIG. 1, which is a schematic block diagram of a communications system that includes an electronic device 100 using an integrated scrollbar options menu according to some embodiments of the present invention. The electronic device 100 may include a display screen 110 that is navigable using a graphical user interface. The electronic device 100 may further include a keypad 148, such as a keyboard or navigational pad, that provides navigation of display content of the display screen 110. Some embodiments provide that the display screen 110 may include a touch-sensitive display or screen, or the like.

Although embodiments described herein may refer to wireless devices, the invention is not so limited. For example, some embodiments may include fixed terminals, stations, and/or devices that may include touch-sensitive displays and/or screens, or the like. Such fixed terminals, stations, and/or devices may not be connected to a wireless communications network or system and/or may not be configured to receive wireless communications signals.

In some embodiments, the electronic device 100 may include a mobile wireless communications terminal that receives wireless communications signals from a cellular base station 102 and/or a wireless local network 116. The cellular base station 102 is connected to an MTSO 106, which, in turn, is connected to a PSTN 112, and a network 114 (e.g., Internet). The electronic device 100 may communicate with the wireless local network 116 using a communication protocol that may include, but is not limited to, 802.11a, 802.11b, 802.11e, 802.11g, 802.11i, and/or other wireless local area network protocols. The wireless local network 116 may be connected to the network 114. The mobile wireless communications terminal included in the electronic device 100 may be a mobile handheld terminal.

In some embodiments, the electronic device 100 may include various components, such as a controller 132, a cellular transceiver 134, a memory 136, and a local network transceiver 180. The memory 136 may store software that may be executed by the controller 132, and may include one or more erasable programmable read-only memories (EPROM or Flash EPROM), battery-backed random, access memory (RAM), magnetic, optical, or other digital storage device, and may be separate from, or at least partially within, the controller 132. The controller 132 may include more than one processor, such as, for example, a general purpose processor and a digital signal processor, which may be enclosed in a common package or separate and apart from one another. In particular, the controller 132 may be configured to control various functions of the electronic device 100, including receiving input from a touch-sensitive display screen 110 or keypad 148.

As shown in FIG. 1, the cellular transceiver 134 typically includes both a transmitter (TX) 161 and a receiver (RX) 162 to allow two-way communications, but the present invention is not limited to such devices and, as used herein, a "transceiver" may include only the receiver 162. The electronic device 100 may thereby communicate with the base station 102 using radio frequency signals, which may be communicated through an antenna 164. For example, the electronic device 100 may be configured to communicate via the cellular transceiver 134 using one or more cellular communication protocols, such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communications protocols as used herein may specify the information communicated, the timing, the frequency, the modulation, and/or the operations for setting-up and/or maintaining a communication connection.

Figure 2:
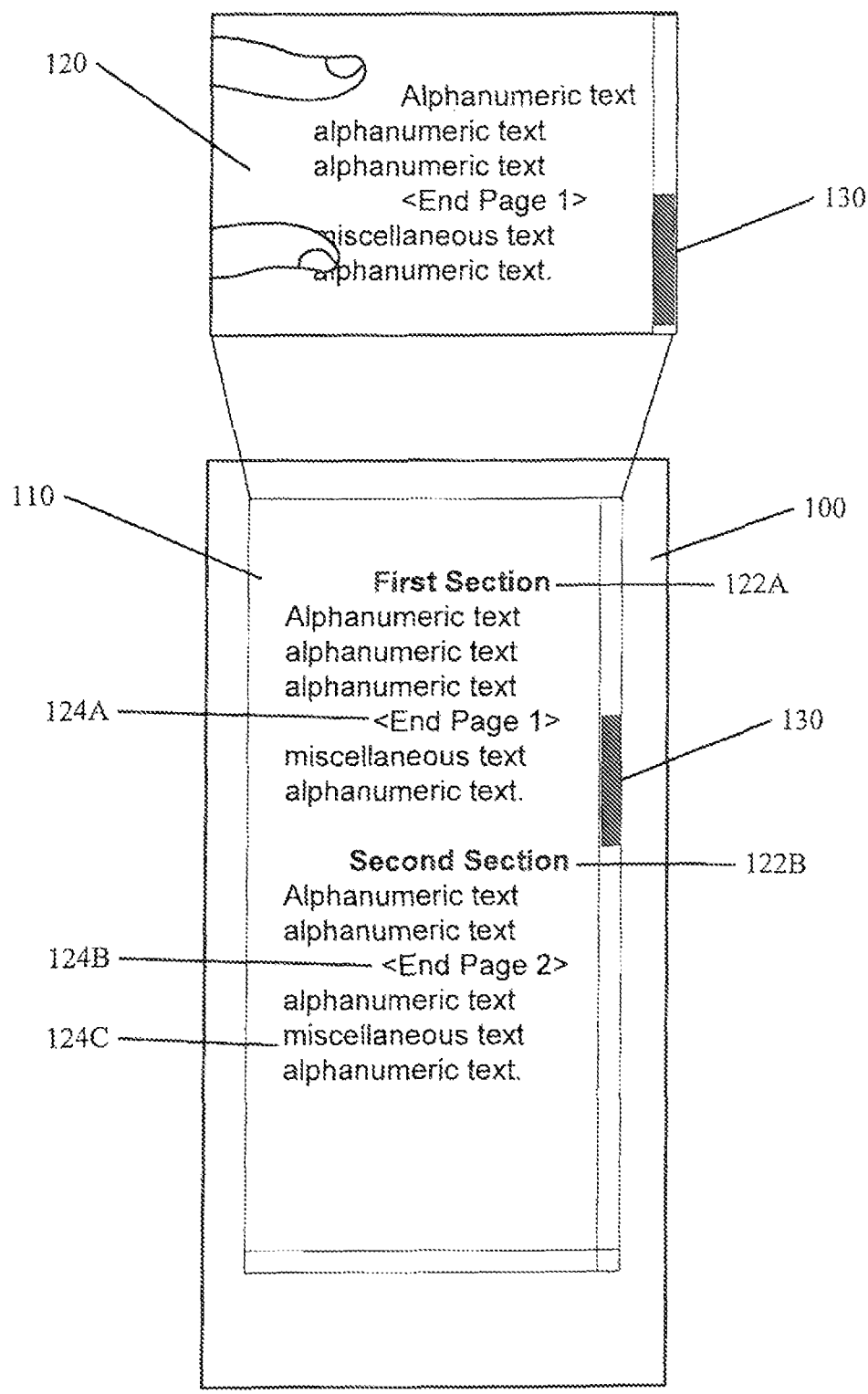
FIG. 2 is a diagram illustrating an electronic device using an integrated scrollbar options menu according to some embodiments of the present invention.

Reference is now made to FIG. 2, which is a diagram illustrating the electronic device 100 using an integrated scrollbar options menu according to some embodiments of the present invention. The electronic device 100 may include a graphical user interface 120 for navigating the display screen 110. The graphical user interface 120 may include a scrollbar 130 that is operable to scroll display content. The display content may include multiple sections and/or pages, among others. For example, as illustrated in FIG. 2, the display content may include a first section 122A and a second section 122B, and may include a first page 124A, a second page 124B, and a third page 124C.

Figure 3:
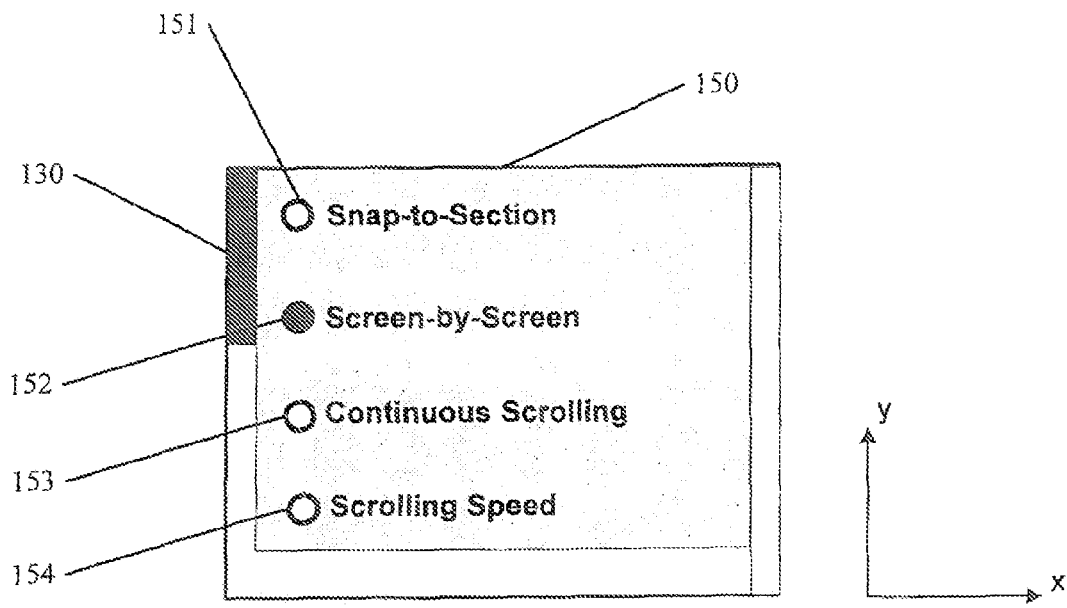
FIG. 3 is a diagram illustrating an integrated scrollbar options menu according to some embodiments of the present invention.

Reference is now made to FIG. 3, which is a diagram illustrating an integrated scrollbar options menu 150 according to some embodiments of the present invention. The integrated scrollbar options menu 150 may include at least one scrolling option. For example, the integrated scrollbar options menu 150 may include a snap-to-section option 151. The snap-to-section option 151 may provide that scrolling of the display content in response to a first navigational movement from the first section 122A of the display content illustrated in FIG. 2 stops at the second section 122B of the display content that is adjacent the first section 122A. For example, the scrolling of the display content may stop at the top of the second section 122B. In another example, when scrolling through an alphabetical list of songs, a first navigational movement from a song that begins with the letter A may provide scrolling that stops at a section of songs that begin with the letter B. In some embodiments, the scrolling of the display content stops at the second section 122B regardless of whether it begins on the same page as the first section 122A or several pages later. In other embodiments, the scrolling of the display content stops at the next section that begins on a different page. Accordingly, in such embodiments, the scrolling of the display content may continue through the second section 122B that is on the same page as the first section 122A and may stop at the third section (not shown) that is on a different page. In some embodiments, the second section 122B may be considered as being on the same page as the first section 122A if both sections begin on the same page. In some embodiments, the second section 122B may be considered as being on the same page as the first section 122A if the first navigational movement is made on a page that includes the beginning of the second section 122B.

The integrated scrollbar options menu 150 may additionally, or alternatively, include a screen-by-screen option 152. The screen-by-screen option 152 provides that scrolling of the display content in response to a first navigational movement from the first screen of the display content stops at the second screen of the display content that is adjacent the first screen. For example, the electronic device 100 may display one page at a time on the display screen 110. As such, the first page 124A of display content may correspond with the first screen, and the second page 124B may correspond with the second screen. In some embodiments, the first navigational movement may scroll directly from the first page 124A to the second page 124B with one scrolling "flick." For example, in embodiments including a touch interface, a scrolling "flick" may include a quick swiping motion across at least a portion of the display screen 110. Such a scrolling "flick" may accelerate the scrolling of display content at a higher rate than other navigational movements.

The integrated scrollbar options menu 150 may additionally, or alternatively, include a continuous scrolling option 153. With the continuous scrolling option 153, a first navigational movement from the first section 122A provides continuous scrolling through the second section 122B.

The integrated scrollbar options menu 150 may additionally, or alternatively, include a scrolling speed option 154. With the scrolling speed option 154, a first navigational movement provides scrolling through the display content at a predetermined rate. For example, selecting the scrolling speed option 154 may increase or decrease the scrolling speed/rate. In some embodiments, the scrolling speed option 154 may enable scrolling through an entire list of display content with one scrolling "flick." Alternatively, the scrolling speed option 154 may enable an increased scrolling resistance that decreases the scrolling speed/rate.

The integrated scrollbar options menu 150 may additionally, or alternatively, include various other options. For example, the integrated scrollbar options menu 150 may include sorting options, such as an option to sort display content alphabetically or chronologically. In some embodiments, the integrated scrollbar options menu 150 may include an option that closes/collapses the integrated scrollbar options menu 150, such as a close button. In some embodiments, the integrated scrollbar options menu 150 may include an option for choosing between different navigational movements that expand or collapse the integrated scrollbar options menu 150. For example, the integrated scrollbar options menu 150 may include an option to choose between expanding/collapsing the integrated scrollbar options menu 150 by dragging the scrollbar 130 and/or by tapping the scrollbar 130. As such, some embodiments provide dragging the scrollbar 130 to collapse the scrollbar 130 and tapping the scrollbar 130 to expand the scrollbar 130, or vice versa. Additionally, the option(s) in the integrated scrollbar options menu 150 may include sub-options. For example, the scrolling speed option 154 may include sub-options that enable multiple different scrolling speeds.

Figure 4A:
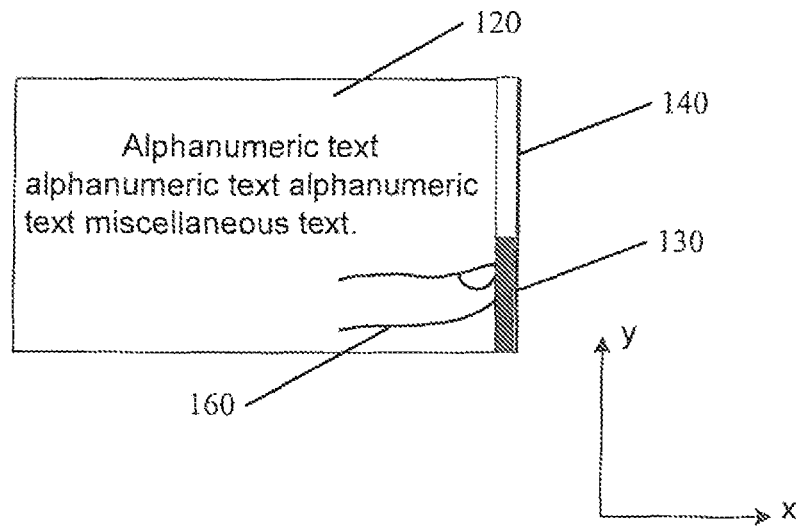
FIGS. 4A-4E are diagrams illustrating different navigational movements of a scrollbar that includes an integrated scrollbar options menu according, to some embodiments of the present invention.

Reference is now made to FIGS. 4A-4E, which are diagrams illustrating different navigational movements of the scrollbar 130 that includes the integrated scrollbar options menu 150 according to some embodiments of the present invention. Referring to FIG. 4A, the scrollbar 130 included in the graphical user interface 120 may be operable to scroll display content in a first direction in response to a first navigational movement of the scrollbar 130. The first direction may correspond to an axis 140 of the scrollbar 130. For example, the scrollbar 130 may be operable to scroll display content along the axis 140 that is substantially parallel with the y-axis illustrated in FIG. 4A and substantially perpendicular to the x-axis. Although not shown in FIG. 4A, the scrollbar 130 may include the integrated scrollbar options menu 150.

In some embodiments, the graphical user interface 120 may include a touch interface. The touch interface may include a touch sensor that is configured to detect a location of a plurality of contact points on the display screen 110 associated with the electronic device 100. For example, the touch interface may be responsive to a pointer 160. In some embodiments, the pointer 160 may include one or more user digits, such as one or more fingers and/or thumbs. Additionally, or alternatively, a stylus or other pointing device may be used as the pointer 160.

In some embodiments, the present invention may include a smart board and/or a wireless pointing device. For example, the electronic device 100 may not be a handheld device, but rather may be a smart board or a vehicle-mounted navigational device, among others. The pointer 160 may include a wireless pointing device that communicates with the graphical user interface 120, such as a laser pointer or a pointer that communicates by radio frequencies, among others.

Referring still to FIG. 4A, the integrated scrollbar options menu 150 may be configured to be accessed/opened by expanding the scrollbar 130 using a second navigational movement of the scrollbar that is different from the first navigational movement. In some embodiments, the integrated scrollbar options menu 150 may be configured to be collapsed into the scrollbar 130 using a third navigational movement of the scrollbar 130. For example, the second navigational movement may include tapping the scrollbar 130. The third navigational movement may also include tapping the scrollbar 130 with the pointer 160. Tapping the scrollbar 130 may include a single tap or a double tap. For example, the second navigational movement may include a single tap and the third navigational movement may include a double tap. Alternatively, the second and third navigational movements may both include a single tap, or they may both include a double tap. In some embodiments, tapping the scrollbar 130 may include tapping a portion of the integrated scrollbar options menu 150.

Figure 4B:
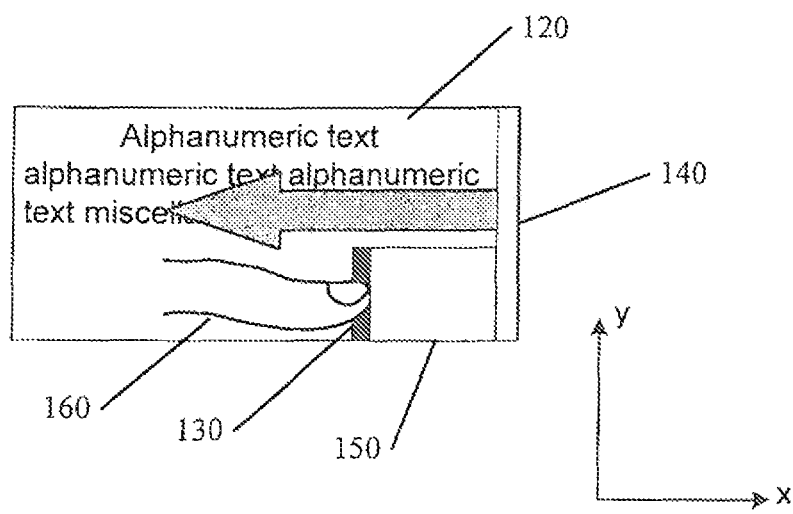

Referring to FIG. 4B, the second navigational movement may include dragging the scrollbar 130, from a collapsed position that may substantially hide the scrollbar options menu 150 toward an expanded position, in a second direction that is substantially perpendicular to the axis 140 of the scrollbar 130. For example, the pointer 160 may be used to drag the scrollbar 130 away from the collapsed position in a direction that is substantially parallel with the x-axis and substantially perpendicular to the y-axis and the axis 140 of the scrollbar 130. The expanded position may display at least a portion of the integrated scrollbar options menu 150. The graphical user interface 120 is not limited to touch interfaces. Rather, the graphical user interface 120 may additionally, or alternatively, include a highlight-driven interface and/or an interface that uses a cursor, such as a mouse cursor, as the pointer 160.

Figure 4C:
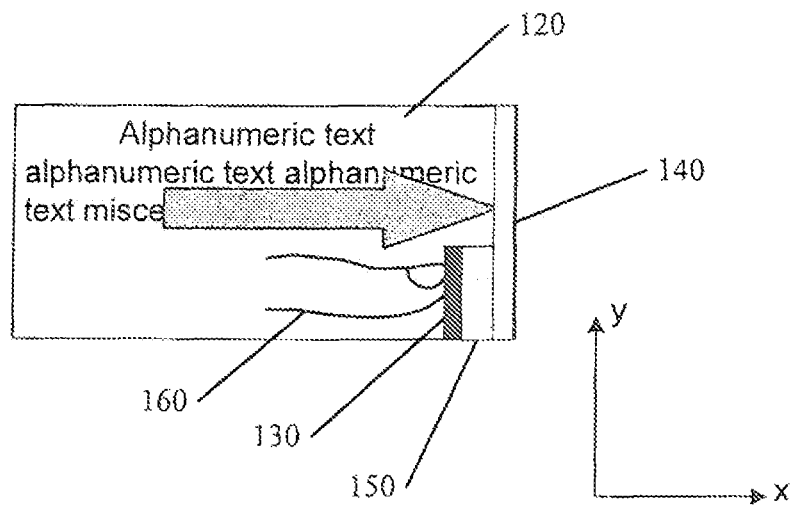

Referring to FIG. 4C, the third navigational movement may include dragging the scrollbar 130 from the expanded position toward the collapsed position. For example, the pointer 160 may be used to drag the scrollbar 130 away from the expanded position, and toward the collapsed position in a direction that is substantially parallel with the x-axis and substantially perpendicular to the y-axis and the axis 140 of the scrollbar 130.

Figure 4D:
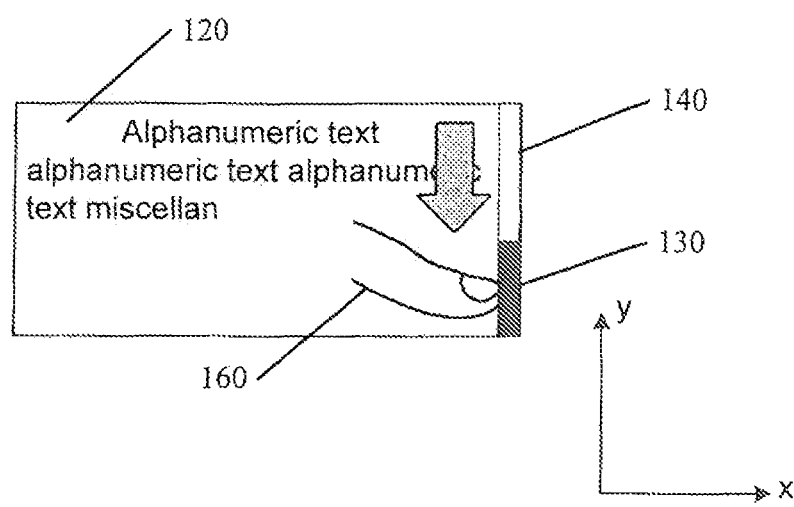

Referring to FIG. 4D, the first navigational movement of the scrollbar 130 in the first direction corresponding to the axis 140 of the scrollbar 130 may be in a direction that is substantially perpendicular to the x-axis and substantially parallel with the y-axis and the axis 140 of the scrollbar. In some embodiments, the first navigational movement of the scrollbar 130 may be in either direction along the axis 140. For example, although the arrow in FIG. 4D illustrates downward navigational movement of the pointer 160 along the axis 140, the first navigational movement may also include upward navigational movement of the pointer 160 along the axis 140. Additionally, the scrollbar 130 may be operable to move in either the same direction along the axis 140 as the pointer 160 or in the opposite direction along the axis 140 as the pointer 160. For example, the scrollbar 130 may be operable to move up the axis 140 when the pointer 160 moves down. In some embodiments, the scrollbar 130 may be operable to scroll display content in a direction that is substantially parallel with the x-axis and substantially perpendicular to the y-axis and the axis 140 of the scrollbar 130.

Figure 4E:
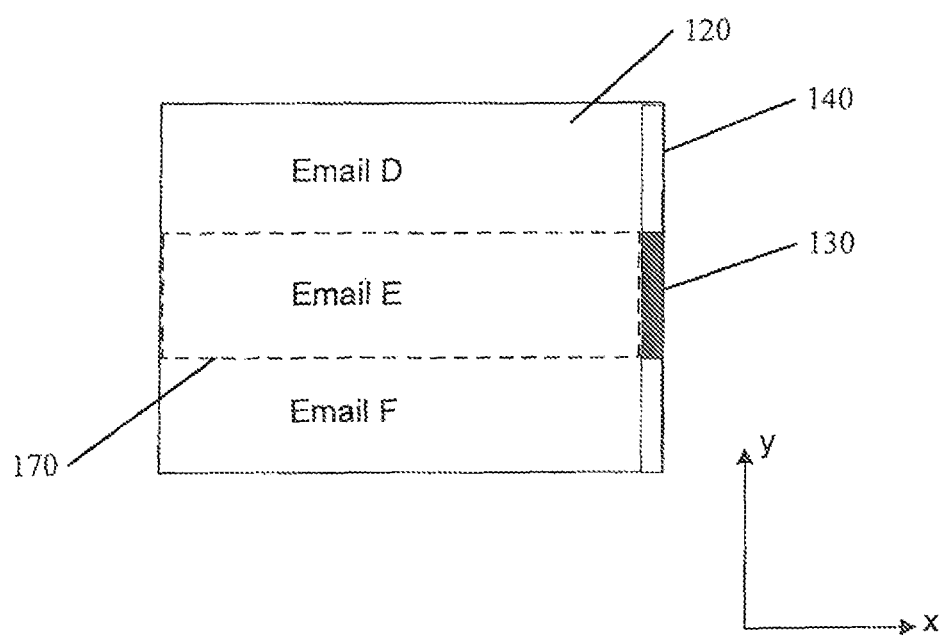

Referring to FIG. 4E, the graphical user interface 120 may include a highlight-driven interface that includes a navigational feature 170. For example, FIG. 4E illustrates a list of emails in which Email E is highlighted (as illustrated by the shaded portion of the graphical user interface 120) by the navigational feature 170. Navigation of the navigational feature 170 may be controlled by the keypad 148 of FIG. 1. The keypad 148 may include arrow keys by which the navigational feature 170 navigates in a direction substantially parallel with the y-axis and the axis 140 of the scrollbar 130 and/or in a direction substantially parallel with the x-axis. For example, the first navigational movement may include operating the navigational feature 170 in a direction that is substantially parallel with the y-axis and the axis 140 of the scrollbar 130. The second navigational movement may include operating the navigational feature 170 to navigate in a second direction that is substantially perpendicular to the axis 140 of the scrollbar 130. The third navigational movement also may include operating the navigational feature 170 to navigate in a third direction that is substantially perpendicular to the axis 140 of the scrollbar 130. Additionally, movement of the scrollbar 130 may correspond with movement of the navigational feature 170.

Some embodiments may combine the highlight-driven interface with the touch interface. For example, the graphical user interface 120 may provide that the scrollbar 130 may be configured to expand/collapse by any one of tapping the scrollbar 130, dragging the scrollbar 130, and operating the navigational feature 170. Moreover, the graphical user interface 120 may provide that the scrollbar moves in the first direction responsive to one of tapping the scrollbar 130, dragging the scrollbar 130, and operating the navigational feature 170, and that the scrollbar moves in the second and/or third direction(s) responsive to a different one of tapping the scrollbar 130, dragging the scrollbar 130, and operating the navigational feature 170.

Figure 5:
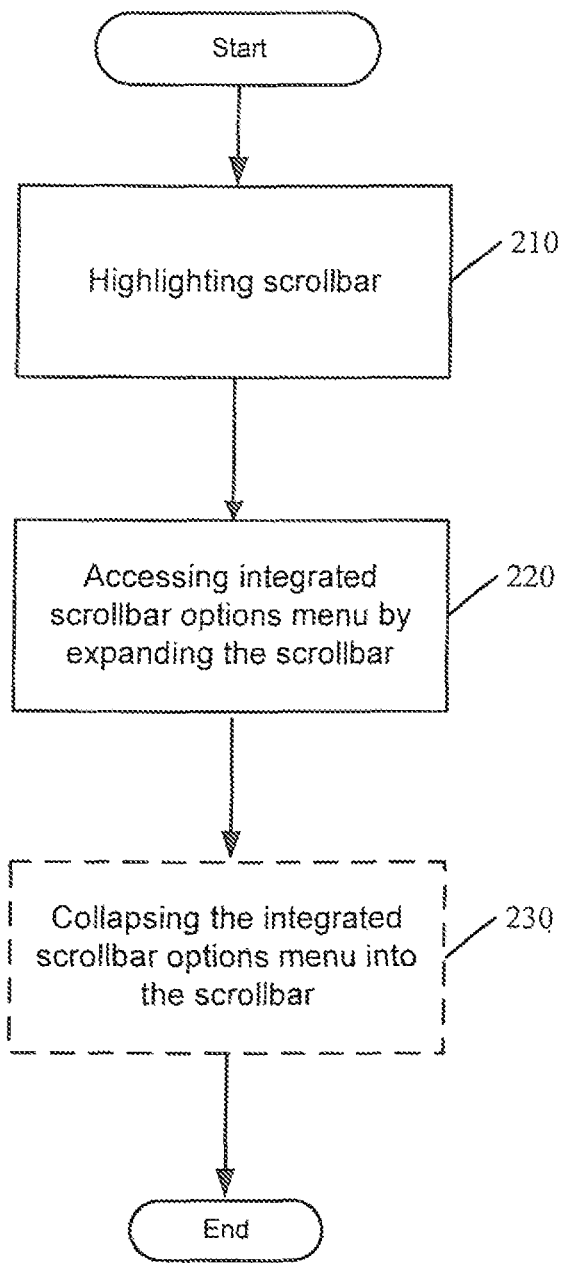
FIG. 5 is a block diagram that illustrates operations of an integrated scrollbar options menu according to some embodiments of the present invention.

Reference is now made to FIG. 5, which is a block diagram that illustrates operations of the integrated scrollbar options menu 150 according to some embodiments of the present invention. First, the scrollbar 130 may be highlighted (Block 210). Next, the integrated scrollbar options menu 150 accessed by expanding the scrollbar 130 (Block 220). The scrollbar 130 may be operable to scroll display content in a first direction corresponding to an axis 140 of the scrollbar 130 in response to a first navigational movement of the scrollbar 130 in the first direction corresponding to the axis 140. Expanding the scrollbar 130 may include using a second navigational movement of the scrollbar 130 that indifferent from the first navigational movement.

Highlighting the scrollbar 130 (Block 210) may include selecting the scrollbar 130 such that a movement in the first direction moves the scrollbar 130. For example, the pointer 160 may be positioned over or near the scrollbar 130. In some embodiments, highlighting the scrollbar (Block 210) includes accessing the navigational feature 170 of the highlight-driven interface, such as by accessing the keypad 148. In some embodiments, the scrollbar 130 may not be visible (e.g., the scrollbar 130 may be hidden). In some embodiments, the scrollbar 130 may remain hidden until highlighted. For example, positioning the pointer 160 over or near an edge of the display screen 110 may highlight the scrollbar 130 and increase the visibility of the scrollbar 130.

In some embodiments, the integrated scrollbar options menu 150 may be collapsed into the scrollbar 130 (Block 230). The integrated scrollbar options menu 150 may be collapsed into the scrollbar 130 using a third navigational movement of the scrollbar 130. In some embodiments, the third navigational movement includes selecting a menu option from the integrated scrollbar options menu 150. For example, the integrated scrollbar options menu 150 may collapse in response to selecting a menu option. Moreover, the integrated scrollbar options menu 150 may be expanded and/or collapsed in accordance with the various embodiments described with regard to FIGS. 1-4.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of operating an integrated scrollbar options menu in a graphical user interface of an electronic device, comprising:

highlighting a scrollbar that is operable to scroll display content in a first direction corresponding to an axis of the scrollbar in response to a first navigational movement of the scrollbar in the first direction corresponding to the axis and that includes the integrated scrollbar options menu; and accessing the integrated scrollbar options menu by expanding the scrollbar using a second navigational movement of the scrollbar that is different from the first navigational movement and includes dragging the scrollbar from a collapsed position that hides the integrated scrollbar options menu toward an expanded position that displays the integrated scrollbar options menu, wherein the integrated scrollbar options menu comprises at least one of:
a snap-to-section option, wherein scrolling of the display content in response to the first navigational movement from a first section of the display content stops at a second section of the display content that is adjacent the first section;
a screen-by-screen option, wherein scrolling of the display content in response to the first navigational movement from a first screen of the display content stops at a second screen of the display content that is adjacent the first screen;
a continuous scrolling option, wherein the first navigational movement from the first section provides continuous scrolling through the second section; and
a scrolling speed option, wherein the first navigational movement provides scrolling through the display content at a predetermined rate.

2. An electronic device that includes an integrated scrollbar options menu, comprising:
a display screen; and
a graphical user interface for navigating the display screen, the graphical user interface including a scrollbar that is operable to scroll display content in a first direction corresponding to an axis of the scrollbar in response to a first navigational movement of the scrollbar in the first direction corresponding to the axis and that includes the integrated scrollbar options menu, the integrated scrollbar options menu being configured to be accessed by expanding the scrollbar using a second navigational movement of the scrollbar that is different from the first navigational movement and includes dragging the scrollbar from a collapsed position that hides the integrated scrollbar options menu toward an expanded position that displays the integrated scrollbar options menu, wherein the integrated scrollbar options menu comprises at least one of:
a snap-to-section option, wherein scrolling of the display content in response to the first navigational movement from a first section of the display content stops at a second section of the display content that is adjacent the first section;
a screen-by-screen option, wherein scrolling of the display content in response to the first navigational movement from a first screen of the display content stops at a second screen of the display content that is adjacent the first screen;
a continuous scrolling option, wherein the first navigational movement from the first section provides continuous scrolling through the second section; and
a scrolling speed option, wherein the first navigational movement provides scrolling through the display content at a predetermined rate.

* * * * *